(12) United States Patent
Kakemura

(10) Patent No.: US 7,123,880 B2
(45) Date of Patent: Oct. 17, 2006

(54) VOICE COMMAND-OPERABLE INFORMATION PROCESSING APPARATUS AND PROGRAM FOR EXTERNAL DATA PRESENTATION

(75) Inventor: Atsushi Kakemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 10/790,799

(22) Filed: Mar. 3, 2004

(65) Prior Publication Data

US 2004/0235466 A1    Nov. 25, 2004

(30) Foreign Application Priority Data

Mar. 4, 2003    (JP)    ............................ 2003-057367

(51) Int. Cl.
H04M 7/00    (2006.01)
(52) U.S. Cl. ........................ 455/41.2; 455/41.3; 455/39
(58) Field of Classification Search ................ 455/41.2, 455/41.3, 39
See application file for complete search history.

(56) References Cited

U.S. PATENT DOCUMENTS

| 2002/0196378 A1 | 12/2002 | Slobodin et al. | |
| 2003/0017846 A1* | 1/2003 | Estevez et al. | 455/556 |
| 2005/0038660 A1* | 2/2005 | Black et al. | 704/275 |

FOREIGN PATENT DOCUMENTS

| EP | 0 594 129 A2 | 4/1994 |
| EP | 1 087 327 A2 | 3/2001 |
| JP | 8-339198 | 12/1996 |
| JP | 2000-222163 | 8/2000 |
| JP | 2001-188668 A | 7/2001 |
| JP | 2002-358062 A | 12/2002 |

OTHER PUBLICATIONS

Notification of Reasons for Rejection (Office Action) for Japanese Patent Application No. 2003-057367, mailed Aug. 9, 2005 and English translation thereof.
European Search Report, issued by the European Patent Office, dated Mar. 11, 2005, in European Patent Application No. 04004526.2-1228.

* cited by examiner

*Primary Examiner*—Nick Corsaro
*Assistant Examiner*—Sayed T. Zewari
(74) *Attorney, Agent, or Firm*—Finnegan, Henderson, Farabow, Garrett & Dunner, L.L.P.

(57) ABSTRACT

An information processing apparatus comprises a first unit which can wirelessly communicate with an external device which displays received image data, a second unit for transmitting the image data to the external device by using the first unit, a third unit for updating the image data transmitted by the second unit, a fourth unit for inputting audio information, a fifth unit for performing recognition processing to the audio information inputted from the fourth unit, and acquiring instruction data inputted by the audio information with respect to the external device, and a sixth unit for transmitting the acquired instruction data by using the first unit.

5 Claims, 4 Drawing Sheets

VOICE COMMAND-OPERABLE INFORMATION PROCESSING APPARATUS AND PROGRAM FOR EXTERNAL DATA PRESENTATION

CROSS-REFERENCE TO RELATED APPLICATIONS

This application is based upon and claims the benefit of priority from prior Japanese Patent Application No. 2003-057367, filed Mar. 4, 2003, the entire contents of which are incorporated herein by reference.

BACKGROUND OF THE INVENTION

1. Field of the Invention

The present invention relates to an information processing apparatus such as PDA (Personal Digital Assistants) and a program used in the information processing apparatus.

2. Description of the Related Art

In recent years, various kinds of portable information processing apparatuses such as PDA, notebook type personal computers and others have been developed. A majority of this type of portable information processing apparatuses have a wireless communication function, and can be wirelessly connected to other information processing apparatuses and various kinds of consumer electronic devices.

As an application system using the wireless communication function of the information processing apparatuses, there is known an information display system which displays image data wirelessly transmitted from an information processing apparatus onto a large screen by using a projector (see, e.g., FIG. 1 of Jpn. Pat. Appln. KOKAI Publication No. 2000-222163). In the information display system, image data stored in a storage device of an information processing apparatus is transmitted to a projector by radio waves.

BRIEF SUMMARY OF THE INVENTION

According to one aspect of the present invention, there are provided an information processing apparatus and a program which can realize a presentation function with the high functionality and the excellent usability.

An information processing apparatus according to one aspect of the present invention is characterized by comprising: means for being able to wirelessly communicate with an external device which displays received image data; means for transmitting the image data to the external device by using the means capable of communicating with the external device; means for updating the image data transmitted by the means for transmitting the image data; means for inputting audio information; means for performing recognition processing to the audio information inputted from the means for inputting audio information, and acquiring instruction data inputted by voice with respect to the external device; and means for transmitting the acquired instruction data to the external device by using the means capable of communicating with the external device.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment according to the present invention will now be described hereinafter with reference to the accompanying drawings.

Figure 1:
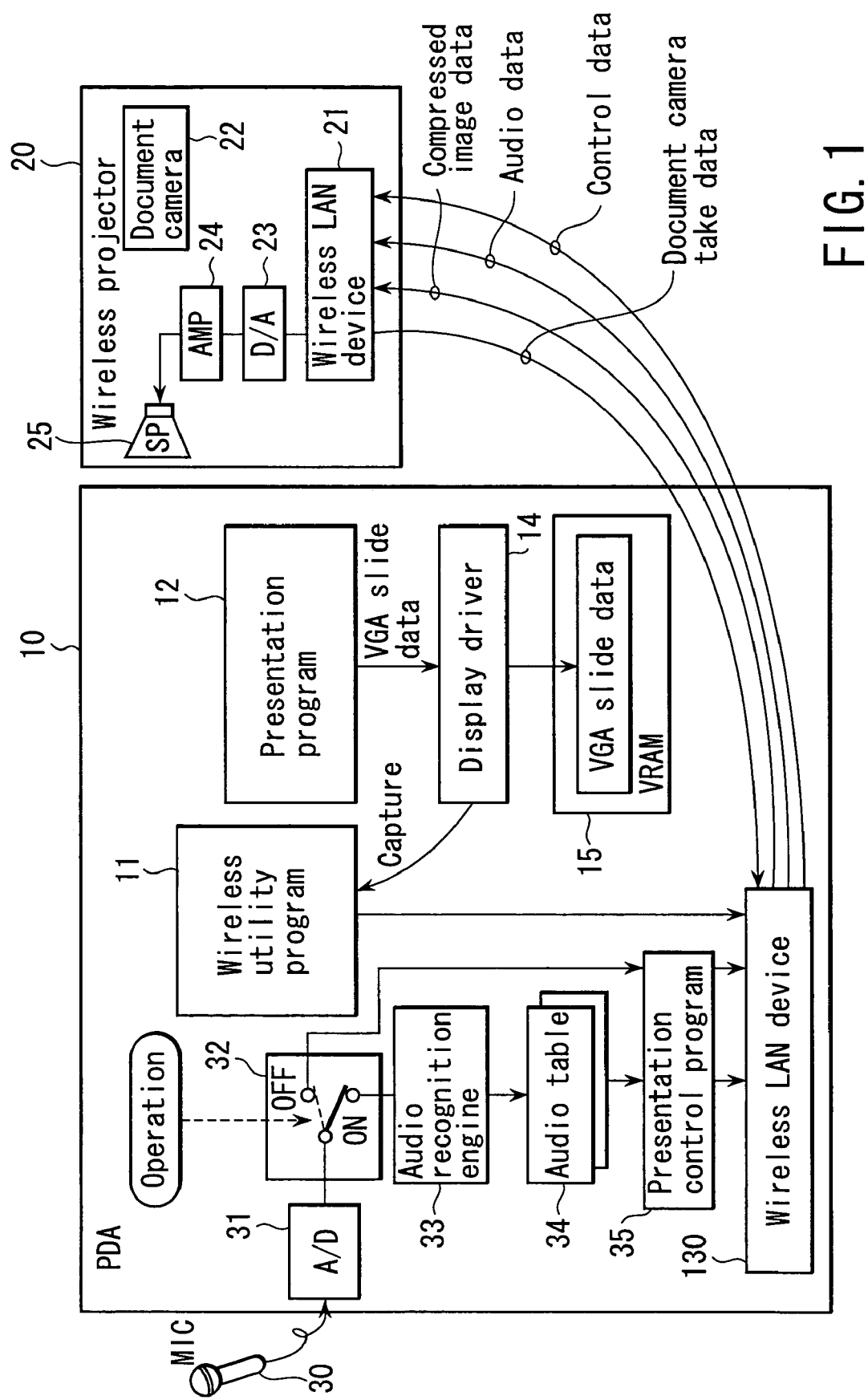
FIG. 1 is a block diagram illustrating a function of an information processing apparatus according to an embodiment of the present invention.

FIG. 1 shows an information processing apparatus according to an embodiment of the present invention. The information processing apparatus is realized as a PDA. A PDA 10 is a portable information processing apparatus which functions as a mobile terminal. The PDA 10 comprises a wireless LAN device 130. The wireless LAN device 130 is a wireless communication device which executes wireless communication in accordance with, e.g., IEEE 802.11a/IEEE 802.11b standard. A wireless presentation function provided to the PDA 10 will now be described hereinafter.

The wireless presentation function is a function to display screen image data drawn by a presentation program 12 executed by the PDA 10 onto a projection screen of a wireless projector 20. The presentation program 12 is an application program to execute a slide show, and it can generate screen image data having a VGA (640×480) size as slide data. The slide data having the VGA (640×480) size will be referred to as VGA slide data hereinafter. When displaying the VGA slide data in a display device of the PDA 10, the VGA slide data is converted into screen image data corresponding to a display resolution of the display device of the PDA 10. The display resolution of the display device is QVGA (320×240) which is a resolution corresponding to ¼ of VGA (640×480). Therefore, a screen image constituting the VGA slide data is contracted to ¼ and then displayed in the display device.

The above-described wireless presentation function is realized by utilizing wireless communication between the PDA 10 and the wireless projector 20. The wireless projector 20 comprises a wireless LAN device 21. The wireless LAN device 21 is a wireless communication device which executes wireless communication in accordance with, e.g., IEEE 802.11a/IEEE 802.11b.

A wireless utility program 11 is installed in the PDA 10 in advance. The wireless utility program 11 is a program to control the wireless presentation. The wireless utility program 11 captures VGA slide data which is drawn in a video memory (VRAM) 15 by the presentation program 12 through a display driver 14, and transmits the captured VGA slide data to the wireless projector 20 through a wireless signal by using a wireless LAN device 130.

In this case, only when the VGA slide data drawn in the VRAM 15 is updated, the updated VGA slide data is transmitted from the PDA 10 to the wireless projector 20.

The updated VGA slide data is compressed and encoded by the wireless utility program 11, and then transmitted to the wireless LAN device 130. The VGA slide data is not transmitted from the PDA 10 to the wireless projector 20 during a period that a content of the VGA slide data is not changed.

The wireless projector 20 receives VGA slide data, and projects an optical image corresponding to the received VGA slide data onto a large screen for projection. In the wireless projector 20, the received VGA slide data is decoded and then written into a frame buffer. An optical image corresponding to the VGA slide data stored in the frame buffer is projected onto the large screen for projection.

Further, the PDA 10 comprises a microphone (MIC) 30, an audio data output unit (A/D) 31, an audio data switching button 32, an audio recognition engine 33, an audio table 34, a presentation control program 35 and others in order to realize an audio remote control by using the wireless LAN device 130. The audio data output unit (A/D) 31 converts an analog audio signal obtained from the microphone 30 into audio data processed in the system.

The audio data switching button 32 is a button selectively operated by a user (presenter in this example). In this example, the audio data switching button 32 is not operated when a sound acquired by the microphone 30 is to be transmitted to the wireless projector 20 as an audio message for presentation, but it is selectively operated when an instruction to the PDA 10 and the wireless projector 20 is performed by using an audio input. In a state that the audio data switching button 32 is operated (ON state), audio data outputted from the audio data output unit (A/D) 31 is supplied to the audio recognition engine 33. In a state that the audio data switching button 32 is not operated (OFF state), audio data outputted from the audio data output unit (A/D) 31 is converted into packet data which is processed in the wireless LAN device 130 by the presentation control program 35, and supplied to the wireless LAN device 130.

Figure 3:
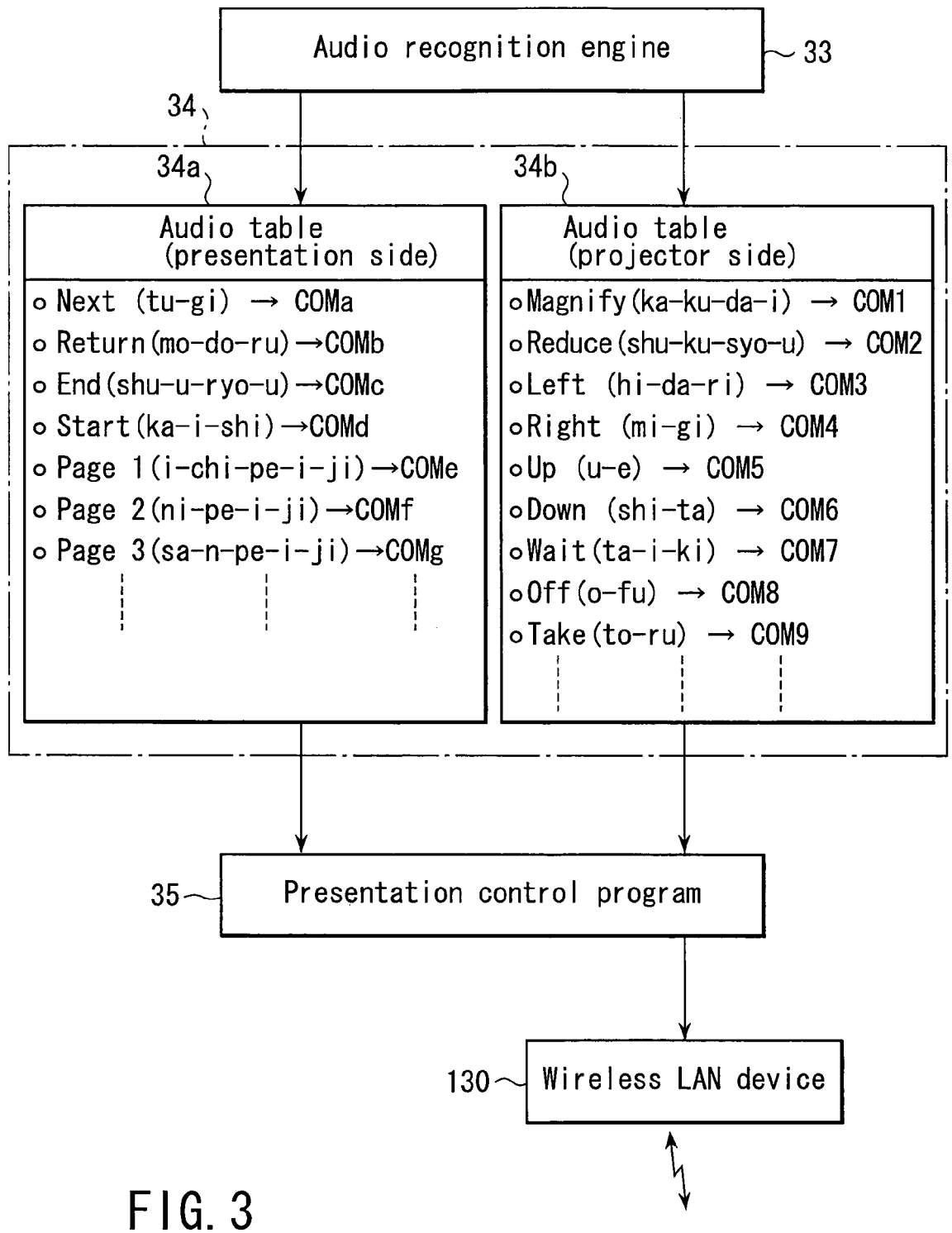
FIG. 3 is a block diagram showing constituent elements used to realize an audio remote control in the embodiment.

The audio recognition engine 33 performs audio recognition of the inputted audio data, and generates instruction information according to the inputted sound by making reference to the audio table 34 based on a result of that recognition. The audio table 34 referred by the audio recognition engine 33 is configured to have a command generation audio table 34a for the PDA 10 and a command generation audio table 34b for the wireless projector 20 as shown in FIG. 3. Conversion data which defines a relationship between audio data and instruction data (commands) is preset in the audio table 34. The conversion data set in the audio table 34 can be arbitrarily changed by an operation of a user.

Figure 4:
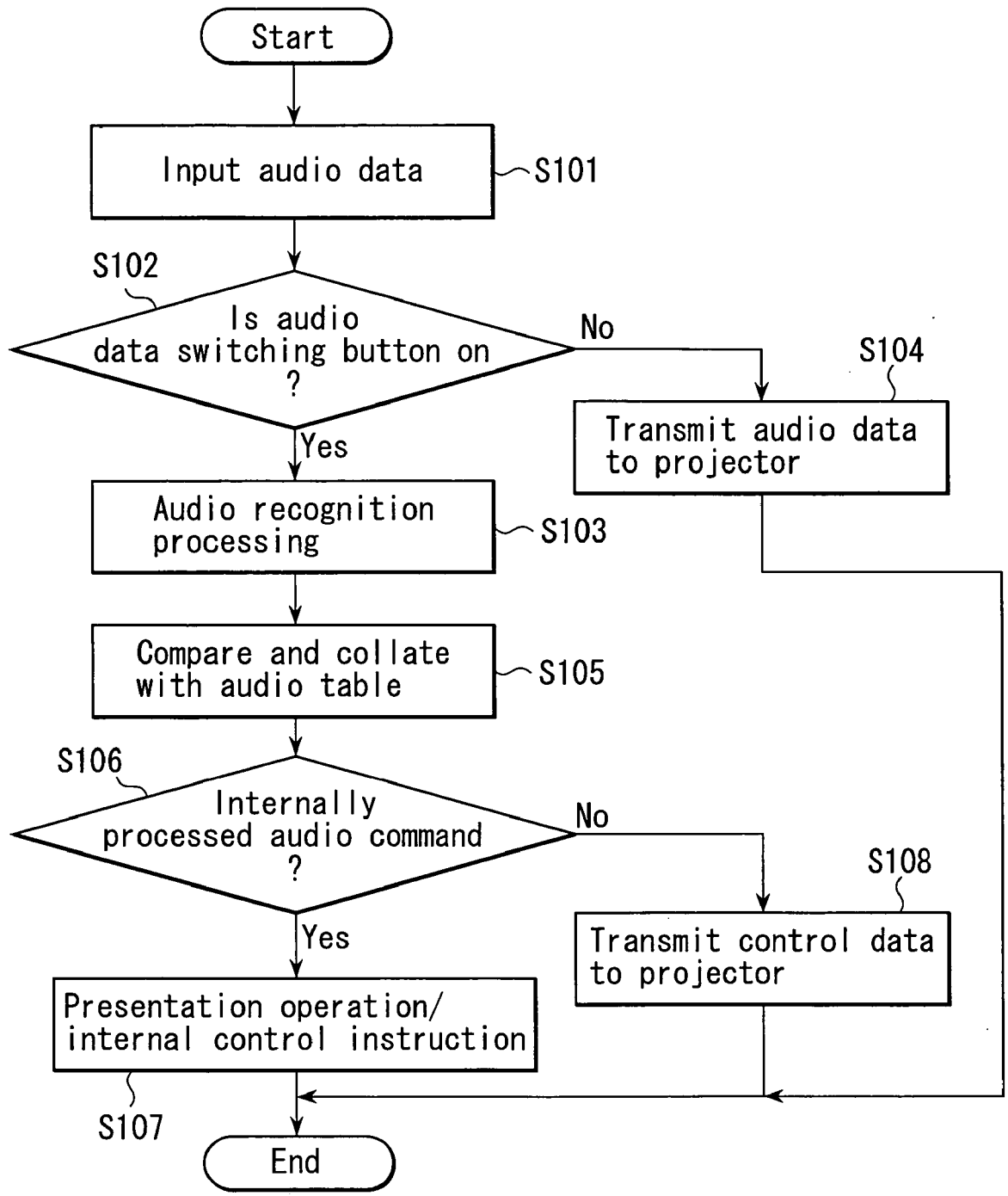
FIG. 4 is a flowchart showing a procedure of wireless presentation processing executed by the information processing apparatus according to the embodiment.

The presentation control program 35 realizes a control and a processing function when executing the presentation function including processing to generate instruction (control) data and audio data involved by an audio input, a control to transfer various data to/from the wireless projector 20 and others. In the embodiment, such an audio data processing function as shown in FIG. 4 is realized.

Furthermore, the wireless projector 20 has a document camera 22 which takes a projection screen image in response to an audio input instruction as well as the wireless LAN device 21. Moreover, an audio signal output unit (D/A) 23, an audio amplifier (AMP) 24, a round speaker (SP) 25 and others which are used to output an audio message received by the wireless LAN device 21 are provided to the wireless projector 20. The audio signal output unit 23 decodes audio message data (audio data packet) received by the wireless LAN device 21, and restores it to an analog audio signal. The audio amplifier 24 electrically amplifies the analog audio signal restored by the audio signal output unit 23, and outputs an audio message from the speaker 25.

A system configuration of the PDA 10 will now be described with reference to FIG. 2.

The PDA 10 comprises a CPU 101, a system controller 102, a memory 103, a display controller 104, a tablet controller 105, an I/O controller 106, a memory card 107, an operation button group 108, a display device (LCD) 111, a tablet 112, a sound controller 117 and others as shown in the drawing in addition to the wireless LAN device 130, the VRAM 15 and the constituent elements (30 to 35) used to realize the audio remote control function.

The CPU 101 is a processor provided to control operations of the PDA 10, and executes an operating system (OS) and various kinds of application programs/utility programs. The operating system (OS) has a tablet control function used to realize a pen input operation.

The memory 103 comprises a non-volatile memory which stores the operating system (OS) and various kinds of application programs/utility programs, and a RAM used as a main memory. The non-volatile memory also stores the wireless utility program 11, the presentation program 12 and the presentation control program 35 and the like which are described above.

The system controller 102 is a bridge device which connects a local bus of the CPU 101 with a system bus 100. The system controller 102 also contains a memory controller which controls the memory 103. The display controller 104 displays in the display device 111 screen image data drawn in the VRAM 15 by controlling an LCD used as the display device 111 of the PDA 10. A display resolution of the display device 111 is QVGA (320×240) which is a resolution corresponding to ¼ of VGA (640×480) as described above.

The VRAM 15 has an on-screen area and an off-screen area. The on-screen area is a storage area to store screen image data having a QVGA (320×240) size displayed in the display device 111, and used as a frame buffer. The display controller 104 sequentially reads screen image data from the on-screen area, and displays it in the display device 111.

The tablet controller 112 controls the tablet 112. The tablet 112 comprises a transparent coordinate detection device provided on a display screen of an LCD constituting the display device 111. The display device 111 and the tablet 112 constitute a touch screen on which a pen input operation is possible.

The I/O controller 106 performs a control over a memory card 107 which is detachably attached to the PDA 10 and a control over the operation button group 108. The operation button group 108 comprises a plurality of operation buttons such as a power button, an application button used to activate a specific application, a cursor key and others. In the embodiment, the audio data switching button 32 shown in FIG. 1 is included.

The sound controller 117 comprises the audio data output unit (A/D) shown in FIG. 1, an audio codec and others, and has a function to encode audio data caught by the microphone 30 and analog/digital-converted by the audio data output unit (A/D) 31 and thereby form a packet thereof.

FIG. 3 shows the constituent elements used to realize the audio remote control function depicted in FIG. 1. Upon receiving audio data from the audio data output unit (A/D) 31 when the audio data switching button 32 is turned on, the audio recognition engine 33 performs audio recognition of the audio data, and generates instruction data according to an inputted sound by making reference to the audio table 34 based on data of the recognition result. In the embodiment, the audio table 34 has a command generation audio table 34a for the PDA 10 and a command generation audio table 34b for the wireless projector 20. Instruction data generated by making reference to the command generation audio table 34a for the PDA 10 is outputted to the system bus 100. Instruction data generated by making reference to the command generation audio table 34b of the wireless projector 20 is processed to form a packet thereof, and transmitted to the wireless LAN device 130.

FIG. 4 shows a processing procedure to perform processing to generate instruction (control) data and audio data involved by an audio input and a control to transfer various kinds of data to/from the wireless projector 20.

An operation in the embodiment according to the present invention will now be described with reference to the respective drawings.

A description will be first given as to a procedure of wireless presentation processing executed by the wireless utility program 11.

When the wireless utility program 11 is activated, the wireless utility program 11 detects wireless projectors existing around the PDA 10. In the example, device detection processing to detect a device capable of communicating with the PDA 10 is executed.

That is, the wireless utility program 11 broadcasts a device detection command to detect devices by using the wireless LAN device 130, and waits for a response with respect to that device detection command. Each wireless projector 20 which has received the device detection command returns a response including an MAC address assigned to the wireless LAN device 21 thereof and an identifier indicative of a device type (=projector) thereof to the PDA 10. Based on this response, the wireless utility program 11 can detect each wireless projector existing in a range to which a wireless signal transmitted from the PDA 10 can be supplied.

Then, the wireless utility program 11 displays a list of the detected wireless projectors on a projector list in the display device 111. Here, when a given wireless projector 20 is selected by a user and "start" of the presentation is instructed by a predetermined button operation or a sound, the wireless utility program 11 transmits a connection request to the wireless projector 20 selected from the projector list, and achieves wireless connection with the selected wireless projector 20. In this processing, not only a physical wireless link between the PDA 10 and the selected wireless projector 20 is established but also a session between them is achieved.

After the wireless connection with the wireless projector 20 is established, the wireless utility program 11 activates the presentation program 12. The activated presentation program 12 starts a slide show (VGA slide show) to sequentially draw VGA slide data in the off-screen area of the VRAM 15.

The wireless utility program 11 acquires the VGA slide data from the off-screen area of the VRAM 15. Additionally, the wireless utility program 11 issues a command to request reading screen image data from the off-screen area of the VRAM 15 to the display driver 14. The display driver 14 reads the screen image data from the off-screen area through the display controller 104, and transfers it to the wireless utility program.

The wireless utility program 11 judges whether the VGA slide data is updated by comparing newly acquired screen image data with previously transmitted screen image data. When the newly acquired screen image data is different from the previously transmitted screen image data, it is recognized that the VGA slide data is updated by the presentation program 12, i.e., new VGA slide data is generated by the presentation program 12. In this case, it is determined that the newly acquired screen image data is data which should be transmitted (i.e., updated VGA slide data). Incidentally, it is determined that the VGA slide data acquired first after the presentation is started is absolutely the updated VGA slide data. The processing to acquire the VGA slide data and the processing to judge whether the acquired VGA slide data is different from the previously transmitted VGA slide data are repeatedly executed at fixed time intervals.

If it is determined that the acquired VGA slide data is the data which should be transmitted (updated VGA slide data), the wireless utility program 11 compresses and encodes the acquired VGA slide data. Then, the wireless utility program 11 judges whether a security mode is selected. If the security mode is selected, the wireless utility program 11 encrypts the compressed and encoded VGA slide data, and transmits the encrypted VGA slide data to the selected projector 20 by using the wireless LAN device 130.

Wireless connection between the PDA 10 and the projector 20 is maintained until a user instructs "end" by using a predetermined button operation or a sound. In a period that this wireless connection is maintained, the above-described processing is repeatedly executed.

A description will now be given as to generation of instruction (control) data and audio data and transfer processing realized by the presentation control program 35 and involved by an audio input. A user can input audio instructions and audio messages concerning the presentation by using the microphone 30 when executing he presentation. A the audio message of the user is inputted to the microphone 30. An analog audio signal outputted from the microphone 30 is supplied to the audio data output unit (A/D) 31. The audio data output unit (A/D) 31 converts the analog audio signal obtained from the microphone 30 into audio data processed in the system (step S101 in FIG. 4).

Further, when the audio data switching button 32 is not operated, the audio data is not supplied to the audio recognition engine 33, but converted into audio message data for a packet processed in the wireless LAN device 130 by the presentation control program 35, and supplied to the wireless projector 20 by using the wireless LAN device 130 (step S104 in FIG. 4).

At this time, when a user (presenter) turns on the audio data switching button 32 and inputs a audio message from the microphone 30 (step S102 in FIG. 4), audio data based on this audio input is supplied to the audio recognition engine 33, and the above-described audio recognition processing and instruction data generation processing using the audio table 34 are executed (steps S103 and S105 in FIG. 4). At this time, in regard to instruction data (COMa, COMb, . . . ) generated from the command generation audio table 34a for the PDA 10 (Yes at a step S106 in FIG. 4), the presentation control program 35 supplies the instruction data to the system bus 100 of the PDA 10 (step S107 in FIG. 4). This instruction data (command) is accepted by the CPU 101 through the system controller 102. For example, when "end" is inputted by the audio message, a command (COMa) generated based on this audio data is accepted by the CPU 101, and processing to terminate the currently executed presentation is effected.

Moreover, in regard to instruction data (COM 1, COM 2, . . . ) generated from the command generation audio table 34b for the wireless projector 20 (No at the step S106 in FIG. 4), the instruction data is formed into a packet and supplied to the wireless projector 20 by using the wireless LAN device 130 (step S108 in FIG. 4).

Upon receiving the data from the PDA 10, the wireless projector 20 discriminates the received instruction data into instruction data and audio message data based on identification information of a header unit of data transferred in the form of a packet. Here, when the discriminated data is the instruction data, this instruction data is supplied to a non-illustrated control unit, and presentation processing according to this instruction data is executed. For example, when a "magnify" command (COM 1) inputted by the audio message is received, an image projected onto the screen is magnified with a predetermined magnifying power. When a "take" command (COM 9) inputted by the audio message is received, a projected screen image is taken by the document camera 22, and transmitted to the PDA 10 by using the wireless LAN device 21.

Additionally, when the discriminated data is audio message data for presentation, this data is supplied to the audio signal output unit 23. The audio signal output unit 23 decodes the audio message data (audio data packet) received by the wireless LAN device 21, restores it to an analog audio signal, and supplies it to the audio amplifier 24. The audio amplifier 24 electrically amplifies the analog audio signal restored in the audio signal output unit 23, and outputs an audio message from the speaker 25.

As described above, it is possible to realize the audio remote control function and the audio message function by effectively exploiting a wireless data transfer path which involves updating a presentation image.

Figure 2:
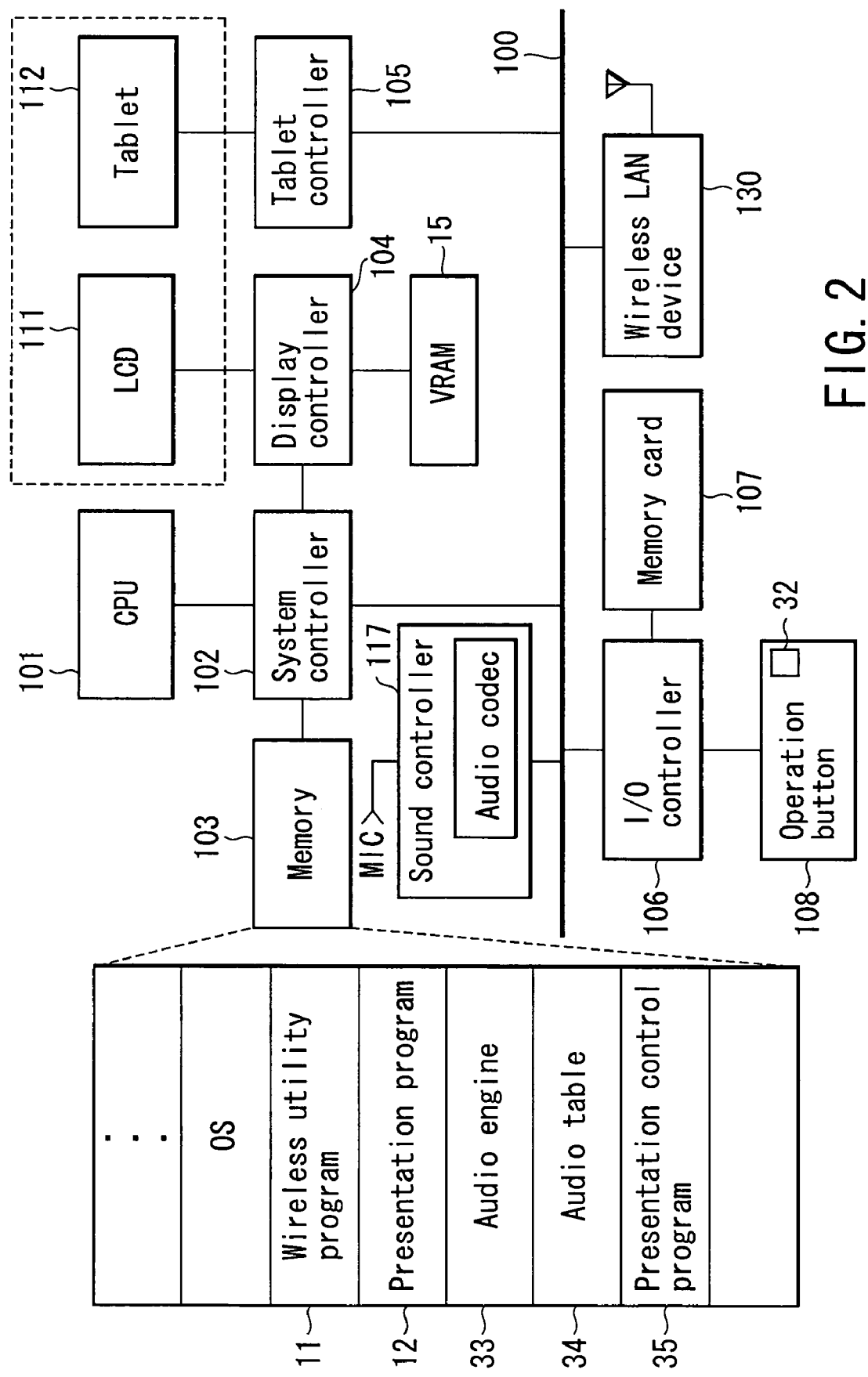
FIG. 2 is a block diagram showing a system configuration of the information processing apparatus according to the embodiment.

It is to be noted that the PDA having a structure shown in FIGS. 1 and 2 is exemplified in the above-described embodiment, but the present invention is not restricted thereto, and the same presentation function as that in the foregoing embodiment can be also realized in various kinds of existing information processing apparatuses having wireless communication with external devices. Further, although the example that the PDA 10 realizes the wireless presentation function using the VGA slide data with respect to the wireless projector 20 is illustrated in each foregoing embodiment, the wireless presentation function using high-definition image data such as SVGA can be also realized.

As described above, according to the embodiment of the present invention, it is possible to realize the information processing apparatus having the wireless presentation function with the high functionality and the excellent usability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An information processing apparatus comprising:

means for being able to wirelessly communicate with an external device which displays received image data;

means for transmitting the image data to the external device by using the means capable of communicating with the external device;

means for updating the image data transmitted by the means for transmitting the image data;

means for inputting audio information being one of instruction information and an audio message;

means for performing recognition processing on the audio information inputted from the means for inputting audio information, and acquiring instruction data from the instruction information based on the recognition processing;

means for transmitting the acquired instruction data to the external device by using the means capable of communicating with the external device, wherein the means for inputting audio information includes means for switching the inputted audio information between the instruction information subjected to the recognition processing and the audio message used by the external device; and means for transmitting the audio message switched by the means for switching the inputted audio information to the external device by using the means capable of communicating with the external device.

2. The information processing apparatus according to claim 1, wherein the means for performing recognition processing comprises:

an external audio recognition table which acquires instruction data for instructing a setting and an operation with respect to the external device from the inputted audio information;

an internal audio recognition table which acquires instruction data with respect to internal processing and control from the inputted audio information; and means for acquiring the instruction data which instructs a setting and an operation with respect to the external device and the instruction data with respect to internal processing and control by making reference to each of the audio recognition tables based on the audio information inputted from the means for inputting audio information.

3. The information processing apparatus according to claim 2, wherein the external audio recognition table includes at least one of instruction data used to operate a presentation image displayed in the external display device and instruction data used to set the external device.

4. The information processing apparatus according to claim 2, wherein the internal audio recognition table includes at least one of instruction data used to control the external device and instruction data used to specify image data to be transmitted to the external device.

5. The information processing apparatus according to claim 1, wherein:

the instruction information subjected to the recognition processing controls an operation of the external device without being reproduced by the external device as audio; and the audio message transmitted to the external device is reproduced by the external device as audio.

* * * * *